J. FAZIO.
DISPLAYING DEVICE.
APPLICATION FILED OCT. 15, 1919.

1,344,685.

Patented June 29, 1920.
2 SHEETS—SHEET 2.

James Fazio
INVENTOR

BY
Richard B. Owen
ATTORNEY

UNITED STATES PATENT OFFICE.

JAMES FAZIO, OF BROOKLYN, NEW YORK.

DISPLAYING DEVICE.

1,344,685.  Specification of Letters Patent.  Patented June 29, 1920.

Application filed October 15, 1919. Serial No. 330,810.

*To all whom it may concern:*

Be it known that I, JAMES FAZIO, a citizen of the United States, residing at Brooklyn, in the county of Kings and State of New York, have invented certain new and useful Improvements in Displaying Devices, of which the following is a specification.

This invention has relation to displaying devices, and has for an object to provide a device or machine for the purpose of advertising the sale of beverages such as orangeade or the like.

Another object of the invention is to provide a displaying device of the character above set forth embodying a modified fruit juice expressing machine, means to simulate the constant feeding of fruit to the said modified machine, and means for causing a circulation of fluid resembling the beverage to be advertised in full view of the observer, to carry out the illusion that the circulating fluid is a product of the fruit expressing device.

In addition to the foregoing, this invention comprehends improvements in the details of construction and arrangement of parts, to be hereinafter described and particularly set forth in the appended claims.

In the accompanying drawing in which similar and corresponding parts are designated by the same characters of reference throughout the several views in which they appear, Figure 1 is a view in front elevation of a device constructed in accordance with my invention.

Fig. 3 is a diagrammatic view of a modified form of the invention.

Figure 1:
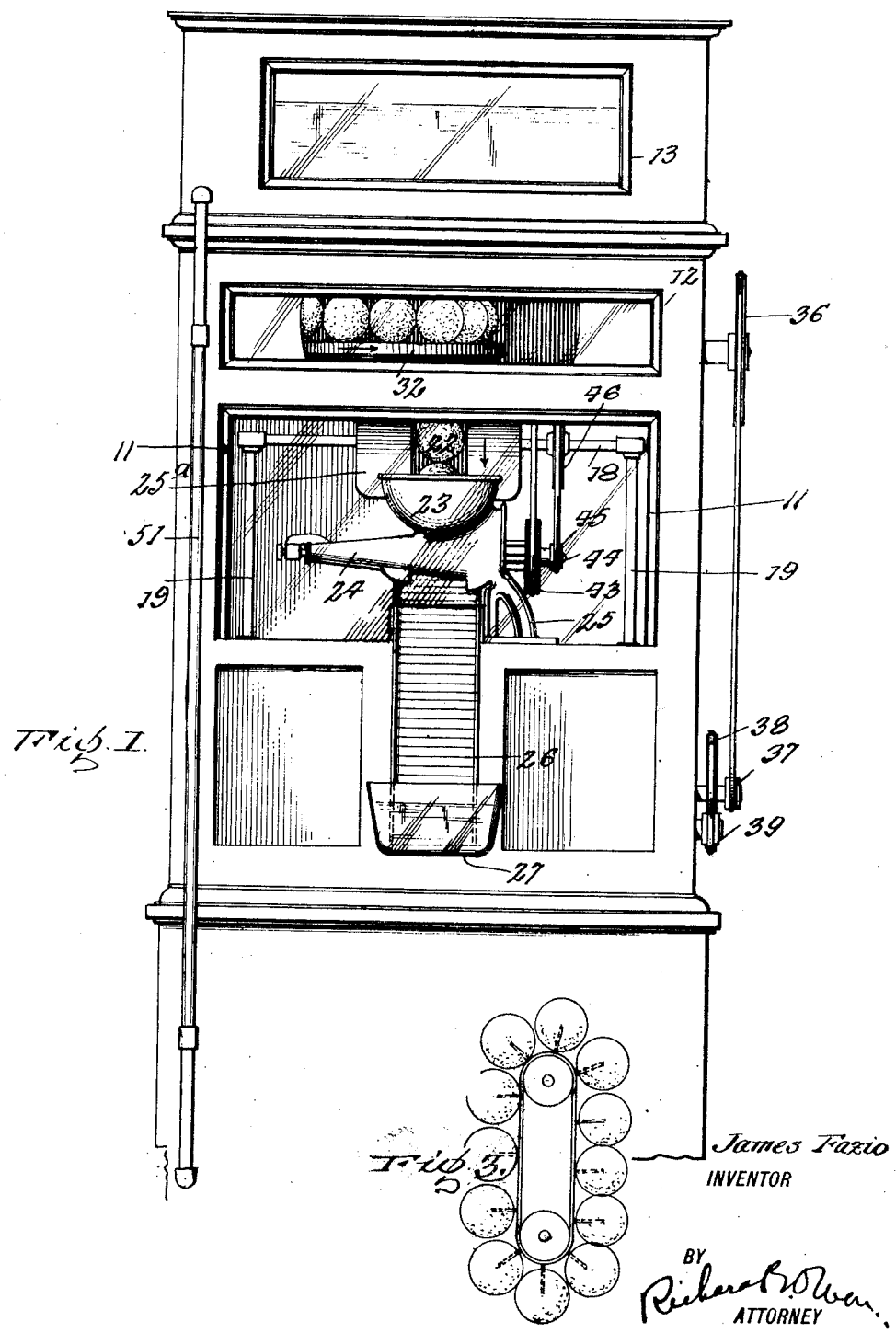
Figure 2:
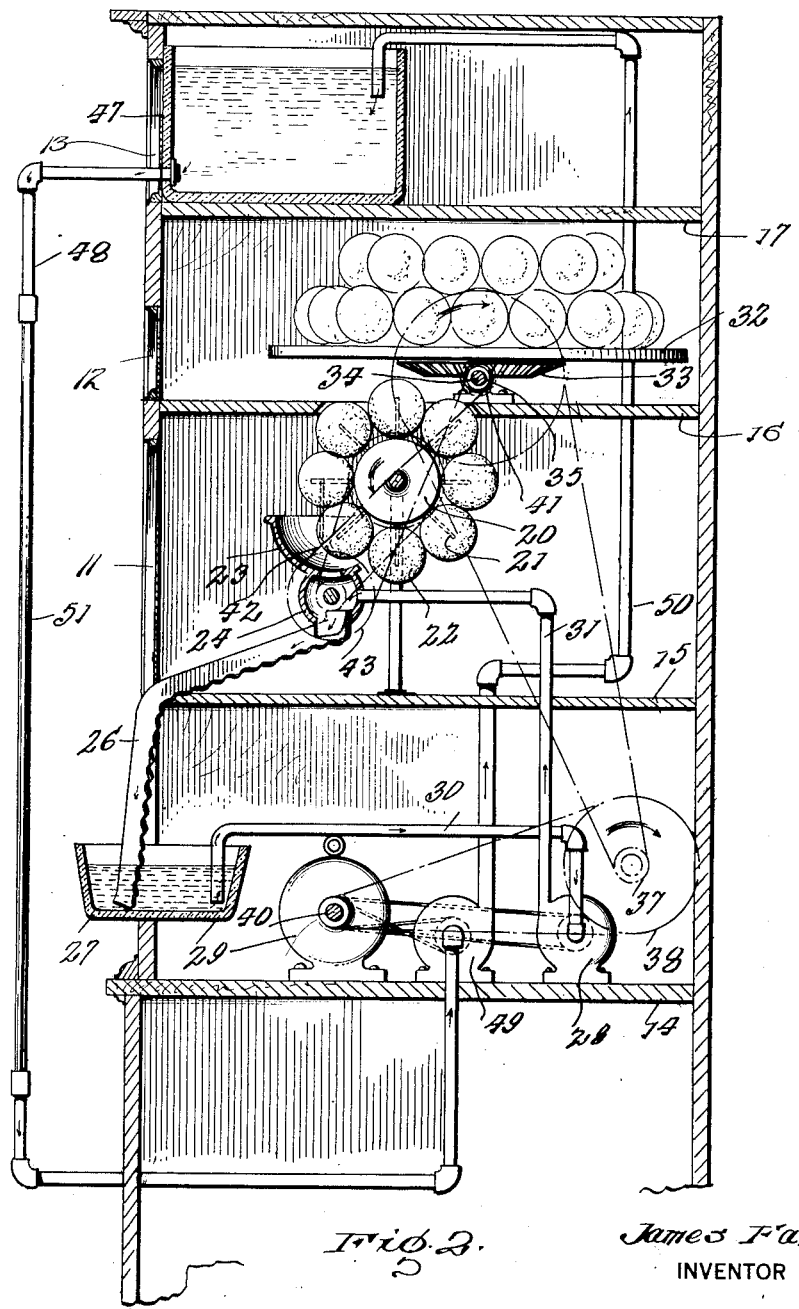
Fig. 2 is a view thereof in vertical section.

With reference to the drawings, 10 indicates a cabinet having openings 11, 12 and 13 formed in the front wall thereof, said openings being covered with glass pane whereby the interior of the cabinet may be viewed. The interior of the cabinet is divided up by means of horizontal floors 14, 15, 16 and 17 to provide a series of compartments. Within the compartment defined by the floors 15 and 16 is a horizontal shaft 18 stationarily mounted upon vertical brackets 19. Loosely mounted on said shaft is a drum 20 carrying a plurality of radial pins 21. Impaled upon these pins are oranges or other fruit indicated at 21, or if desired imitations thereof may be employed. Located in advance of the structure just described is a modified fruit expressing machine. An ordinary fruit juice expressing machine is taken and the major portion of the interior mechanism is removed so as to leave only sufficient to identify the device as a fruit juice expressing machine when viewed from the exterior leaving the hopper 23 and barrel 24 mounted upon the stand 25 which is in turn secured to the floor 15. The rear portion of the hopper 23 is cut away and the device is so located that during rotation of the drum 20 the object 22 may pass through the hopper. A pair of shields 25 are provided, one at each side of the drum 20 and which extend partly into the hopper 23 to hide any portion of the internal mechanism. An opening is formed in the lower portion of the bar 24 and a trough 26 is provided, bent at an angle with the upper end leading into the opening of the drum and its opposite end extending through an opening in the glass panel covering the opening 11 of the cabinet and its lower end exposed outside of the machine and entering a glass tank 27 held partly within the cabinet and partly without. The bottom of the trough is preferably corrugated to cause the material to ripple as it flows thereover and is furthermore silver plated. A rotary pump 28 is mounted upon the floor 14 and is driven by means of a belt and pulley from a motor 29. The intake of the pump is connected by means of a pipe 30 to the tank 29, while the outlet of the pump is connected by means of a pipe 31 to the barrel 24.

Mounted within the compartment defined by the floors 16 and 17 is a horizontal rotating platform 32 which carries a beveled gear 33 on its underside. A horizontal shaft 34 is extended through the wall of the cabinet and carries a double pinion 35 upon its inner end for meshing engagement with the beveled gear 33. The outer end of the shaft 34 carries a relatively large pulley 36 which is connected by means of a belt to a small pulley 37 loosely mounted upon a shaft and carrying a relatively large pulley 38 which is connected by means of a belt to a small pulley 39 mounted upon the shaft 40 of the motor 29 mentioned above. The aforesaid shaft 34 carries a pulley 41 which is connected by means of a belt 42 to a pulley 43 mounted upon the shaft 44 which extends from the barrel 24. Said shaft 44 also carries a pulley 45 which is connected by means of a belt with a pulley 46 mounted upon the shaft 18. The belt 20 it will be observed is preferably crossed in order to provide for relative rotation of the parts.

In operation, motion of the motor 40 is transmitted through the series of pulleys 39, 38, 37 and 36 to the shafts 34, thereby setting the platform 32 in rotation. Motion of the shaft 34 is communicated by means of the belt 29 to the shaft 44, the motion of the latter being in turn communicated to the shaft 18 through the system of pulleys provided therebetween. It will be observed that owing to the rotation of the turn table 32, the observer, looking into the opening 12 of the cabinet observes the oranges or other fruit passing from left to right, and on looking through the opening below observes the oranges or objects 22 passing from the top to bottom and thus the illusion of a horizontal feed converted into a vertical downward feed is given. The fluid material flows down the chute 26 in view of the observer, apparently being expressed from the fruit thence into the hopper 23. The accumulated fluid in the tank 27 is transferred by means of a pump 28 back into the barrel 24 of the fruit expressing device through the pump and connections as described.

I also provide a glass tank 47 in the compartment defined by the floor 17 in the top of the cabinet and I lead a pipe 48 from the lower end of said tank toward the front of the cabinet, entering the lower portion thereof and connect the same with the intake of a rotary pump 49, the outlet of which is connected by means of a pipe 50 to the tank 47. The pipe 48 may be provided with a transparent section 51 of glass. The pump 49 may be driven directly from the motor 29 as shown. The fluid in the tank 47, which fluid may be colored to resemble orangeade or the like is transferred by means of the pump or rather caused to circulate through the pipe 51 in view of the observer.

Thus it will be observed that I have provided a novel form of displaying device which is capable of carrying out the illusion of expressing fruit juices with fidelity, so that the device may be displayed in places where fruit juices are dispensed as beverages, for advertising the same, creating an interest in the use of such beverages, and thereby increasing the trade of the merchant employing the device. Other uses and advantages will readily occur to those familiar with the art to which this invention appertains.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit of the invention or the scope of the appended claims.

Having thus described my invention, what I claim as new and desire to secure by United States Letters Patent is:

1. In a displaying device, a cabinet having openings therein, means for feeding a plurality of objects in one direction to be observed through one opening, means for feeding a series of similar objects in another direction to be observed through another opening, a casing of a fruit pressing machine having a moving part, said casing being located to receive the second feed, and means for moving said part.

2. A displaying device, including a cabinet having a plurality of openings, means for feeding a plurality of objects past one opening in one direction, means for feeding similar objects past another opening in a different direction, a casing of a fruit pressing machine having a portion resembling a hopper to partly receive the second series of objects, a rotating part on said casing, a prime mover, and means for operating said feeding means and for rotating the rotating part from the prime mover.

3. In a displaying device, a cabinet having openings therein, means for feeding a plurality of objects past one opening in one direction, means for feeding a second series of similar objects past the other opening in a different direction, a casing of a fruit expressing machine having an enlarged portion resembling a hopper and open at one side whereby the second series of objects may pass through said opening, a rotating part mounted on the casing, a prime mover, a receptacle, means for delivering fluid to said receptacle, means for operating the moving part of said casing, and for operating the feeding means, and means operable from the prime mover for causing a circulation of said fluid from and to the receptacle.

4. In a displaying device, a cabinet having openings therein, a rotatable platform having a series of objects therein movable in front of one opening, a rotatable member carrying a series of objects observable through the other opening and movable in a direction at right angles to the movement of the platform, a casing of a fruit expressing machine in which the hopper is cut away at one side to permit the second series of objects to pass therethrough, a moving part on said casing, a prime mover, a trough extending from the casing downward, a tank receiving the lower end of the trough, means for rotating the platform from the prime mover, means for operating the moving part from the prime mover, and a pump operable by the prime mover for causing a circulation of fluid from the tank to the upper end of the trough.

5. In a displaying device, a cabinet having an opening therein, a horizontal shaft, a drum mounted on said shaft, a plurality of radial pins carried by said drum, a plurality of objects impaled on said pin, a casing of a fruit expressing machine having a hopper portion partly cut away through which the objects may pass, a moving part on said casing, and means for operating the moving part and for rotating the drum.

6. In a displaying device, a cabinet having a pair of openings, a member behind one opening mounted for movement, a plurality of objects mounted on said member, a second movable member behind the other opening in a direction different from that of the first member, a plurality of objects similar to the first mentioned objects mounted upon the second member, and means for moving both said members to create the illusion that the moving objects observed through the second opening are the same as those previously observed through the first opening.

7. In a displaying device, a cabinet having a pair of vertically arranged openings, a horizontal rotatable member mounted behind the first opening, a plurality of objects mounted upon said member, a member rotatably mounted for rotation in a plane behind the second opening, a plurality of objects similar to the first mentioned objects mounted upon said second rotatable member, and means for rotating both said members simultaneously to create the illusion that the moving objects observed through the second opening are the same objects previously observed through the first opening.

8. In a displaying device, a cabinet having a pair of vertically arranged openings, a horizontal, rotatable table behind the first opening, a plurality of objects mounted upon the table, a drum mounted for rotation in a vertical plane displayed behind the second opening, a plurality of radial pins carried by said drum, an object mounted on each pin similar to the first mentioned objects, and means for moving the table and drum simultaneously to create the illusion that the objects observed through the second opening are the same as those previously observed through the first opening.

In testimony whereof I affix my signature in presence of two witnesses.

JAMES FAZIO.

Witnesses:
 W. J. CAMAN,
 B. F. GARVEY.